F. E. THOMES.
HOSE COUPLING.
APPLICATION FILED SEPT. 18, 1909.
947,501.
Patented Jan. 25, 1910.
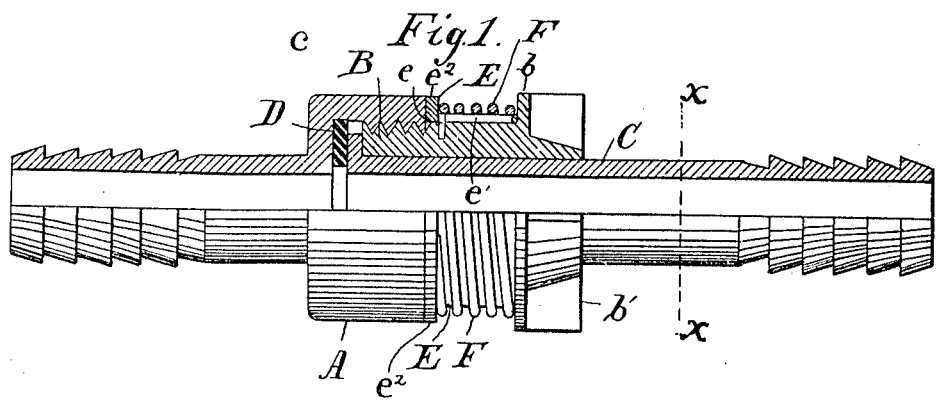
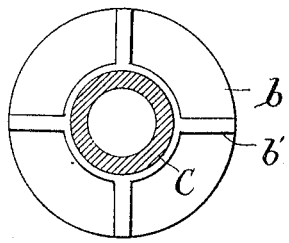
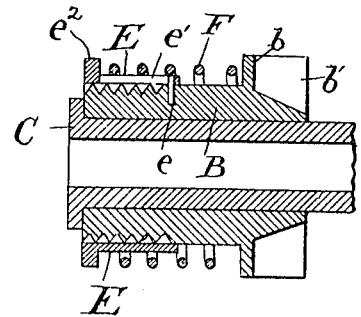
Witnesses:
Percy M. Andrews.
Eleanor W. Dennis
Inventor:
Frank E. Thomes
by S. W. Bates
Atty.

UNITED STATES PATENT OFFICE.

FRANK E. THOMES, OF PORTLAND, MAINE.

HOSE-COUPLING.

947,501.  Specification of Letters Patent.  Patented Jan. 25, 1910.

Application filed September 18, 1909. Serial No. 518,355.

*To all whom it may concern:*

Be it known that I, FRANK E. THOMES, a citizen of the United States of America, and a resident of Portland, in the county of Cumberland, State of Maine, have invented certain new and useful Improvements in Hose-Couplings, of which the following is a specification.

My invention relates to hose couplings of that class wherein a threaded male member engages a threaded female member and it is particularly designed to be used on hose carrying compressed air. In couplings of this class it is usual to leave the screw threads of the male member unprotected when the coupling is disconnected, thus rendering the threads liable to become dented or otherwise injured and preventing the coupling from making a tight joint when it is coupled up. This is particularly the case in foundries, machine shops, ship yards and other places where heavy work is done and where the hose are subjected to rough usage and where air hose is much used.

Leaky hose couplings cause a great waste of air and consequently a great expense through the loss of power and hence the importance of having a coupling that is tight when new and that will remain tight notwithstanding the rough handling it is liable to get in the shop.

Many quick acting hose couplings have been used but it is generally conceded that none are better than the old screw coupling provided the threads can be protected from injury.

The object of my invention is to provide the male member of old and well known screw coupling with a protecting sleeve which will allow the female member to be screwed on freely while protecting the threads of the male member when the coupling is disconnected.

My invention consists essentially of providing the male member with a protecting sleeve or covering which is longitudinally movable with a spring for pressing it normally to the outer end of the male member while allowing it to yield when the female member is screwed on.

I have illustrated my invention by means of the accompanying drawing in which—

Figure 1 shows half elevation and half central longitudinal section through a hose coupling of the well known type shown in its coupled position with my thread protecting sleeve applied. Fig. 2 is a section on the line x x of Fig. 1, and Fig. 3 is a longitudinal section through the male member disengaged from the female member.

In the drawing, A represents the female member, D is the gasket, C is the nipple of the male member and B the male member proper turning loosely on the nipple C and adapted to press the annular flange c on the end of the nipple against the gasket D.

On the rear portion of the male member B are formed finger holds b' for furnishing a bearing for the fingers in screwing the parts together and an outward projecting annular flange b is formed on the male member to furnish a bearing for the rear portion of the spring hereinafter described.

The male member B of the coupling is provided with a protecting sleeve which when the coupling is disengaged, springs out and covers the screw threads and when engaged slides back out of the way of the female member. As shown, the male member B is somewhat elongated with its screw threads on its outer end and a plain cylindrical portion immediately forward of the flange b. The sleeve fits loosely over the male member where it is free to slide longitudinally and it is pressed normally toward the end by a suitable spring. As here shown the sleeve has on its forward or outer end an outwardly extending annular flange $e^2$ and surrounding the sleeve is the helical spring F the forward end bearing against the flange $e^2$ and the rear end bearing against the flange b. Thus the force of the spring tends always to force the sleeve outward and when the parts are disconnected the sleeve covers and protects the screw threads at the end of the male member. Means are provided for limiting the motion of the sleeve so that it will not slip from the end of the male member and as here shown, I form a longitudinal slot e' in the sleeve and through the slot is passed a pin e which is driven into the male member. It will thus be seen that when the female member is disengaged from the male member, the sleeve E will spring out to the end of the male member as shown in Fig. 3 covering and protecting the threads and preventing them from being injured. When the female member is screwed on, the sleeve gives way and slides back onto the cylindrical portion of the male member without obstructing the operation of coupling.

The device is simple, cheaply made and by its use tight joints may always be maintained and loss of air prevented.

It is to be understood that the spring for maintaining the sleeve in its outer position may be otherwise applied than as herein shown without departing from my invention.

I claim:—

1. A hose coupling of the class described having screw threaded male and female members and including a protecting sleeve covering the screw thread on the male member and adapted to slide longitudinally thereon and a spring for pressing the sleeve normally outward to the end of the male member.

2. A hose coupling of the class described having screw threaded male and female members and including a protecting sleeve covering the screw thread on the male member and adapted to slide longitudinally thereon, a spring for pressing the sleeve normally outward to the end of the male member, a stop for limiting the outward motion of the sleeve.

3. A hose coupling of the class described having screw threaded male and female members, and including a protecting sleeve covering the screw thread on the male member and adapted to slide longitudinally thereon, and a helical spring on the outside of said sleeve for pressing the sleeve normally outward to the end of the male member.

4. A hose coupling of the class described having screw threaded male and female members and including a protecting sleeve covering the screw thread on the male member said sleeve having therein a longitudinal slot and an outwardly extending annular flange on its outer end and being adapted to slide longitudinally on said male member, a helical spring on the outside of said sleeve and an annular flange on the male member, said spring extending between and impinging on the said two annular flanges to force the sleeve normally outward to the end of the male member and a pin passing through said slot and into the side of the male member.

In witness whereof I have hereunto set my hand this 10th day of August, 1909.

FRANK E. THOMES.

Witnesses:
S. W. BATES,
E. W. DENNIS.